United States Patent
Jakubiuk et al.

(10) Patent No.: US 11,720,351 B2
(45) Date of Patent: Aug. 8, 2023

(54) MICROKERNEL-BASED SOFTWARE OPTIMIZATION OF NEURAL NETWORKS

(71) Applicant: ONSPECTA, INC., Redwood City, CA (US)

(72) Inventors: Victor Jakubiuk, San Francisco, CA (US); Sebastian Kaczor, Poznan (PL)

(73) Assignee: OnSpecta, Inc., Redwood City, CA (US)

( * ) Notice: Subject to any disclaimer, the term of this patent is extended or adjusted under 35 U.S.C. 154(b) by 308 days.

(21) Appl. No.: 17/204,878

(22) Filed: Mar. 17, 2021

(65) Prior Publication Data

US 2021/0294602 A1 Sep. 23, 2021

Related U.S. Application Data

(60) Provisional application No. 62/990,496, filed on Mar. 17, 2020.

(51) Int. Cl.
| | |
|---|---|
| *G06F 8/40* | (2018.01) |
| *G06F 9/22* | (2006.01) |
| *G06N 3/04* | (2023.01) |
| *G06F 8/41* | (2018.01) |
| *G06N 3/08* | (2023.01) |
| *G06F 9/54* | (2006.01) |

(52) U.S. Cl.
CPC .............. *G06F 9/223* (2013.01); *G06F 8/41* (2013.01); *G06N 3/04* (2013.01); *G06N 3/08* (2013.01); *G06F 9/541* (2013.01)

(58) Field of Classification Search
CPC ............ G06F 9/223; G06F 9/541; G06F 8/41; G06N 3/04

See application file for complete search history.

(56) References Cited

U.S. PATENT DOCUMENTS

| | | | |
|---|---|---|---|
| 7,979,852 B2 * | 7/2011 | Bodin ..................... | G06F 8/443 |
| | | | 717/150 |
| 8,234,622 B2 * | 7/2012 | Meijer ..................... | G06F 8/36 |
| | | | 717/104 |
| 10,409,610 B2 * | 9/2019 | Beckmann ........... | G06F 9/3887 |
| 10,649,789 B2 * | 5/2020 | Su ......................... | G06F 9/3887 |
| 10,732,943 B2 * | 8/2020 | Sun ........................ | G06F 8/315 |
| 10,949,182 B2 * | 3/2021 | Venkataramani ....... | G06F 8/452 |
| 11,340,936 B2 * | 5/2022 | Lee ........................ | G06F 13/28 |

(Continued)

*Primary Examiner* — Cheng Yuan Tseng
(74) *Attorney, Agent, or Firm* — Cognition IP, P.C.; Edward Steakley; Aroon Karuna (57) ABSTRACT

Disclosed are systems and methods related to providing for the optimized software implementations of artificial intelligence ("AI") networks. The system receives operations ("ops") consisting of a set of instructions to be performed within an AI network. The system then receives microkernels implementing one or more instructions to be performed within the AI network for a specific hardware component. Next, the system generates a kernel for each of the operations. Generating the kernel for each of the operations includes configuring input data to be received from the AI network; detecting a specific hardware component to be used; selecting one or more microkernels to be invoked by the kernel based on the detection of the specific hardware component; and configuring output data to be sent to the AI network as a result of the invocation of the microkernel(s).

20 Claims, 10 Drawing Sheets

(56) References Cited

U.S. PATENT DOCUMENTS

| | | | |
|---|---|---|---|
| 11,494,208 B2* | 11/2022 | Jakubiuk | G06F 9/4552 |
| 11,593,628 B2* | 2/2023 | Febbo | G06N 3/084 |
| 11,599,376 B1* | 3/2023 | Viswanathan | G06F 9/3877 |
| 2019/0227795 A1* | 7/2019 | Chen | G06F 9/30101 |
| 2020/0320367 A1* | 10/2020 | Norman | G06F 17/15 |
| 2021/0103433 A1* | 4/2021 | Kerr | G06N 3/045 |
| 2021/0182036 A1* | 6/2021 | Shafiq | G06N 3/063 |
| 2021/0256385 A1* | 8/2021 | Wang | G06F 18/2136 |
| 2021/0294602 A1* | 9/2021 | Jakubiuk | G06N 3/10 |
| 2021/0398015 A1* | 12/2021 | Fogal | G06N 20/00 |
| 2022/0092410 A1* | 3/2022 | Sander | G06N 3/045 |
| 2022/0137868 A1* | 5/2022 | Kim | G11C 11/54 |
| | | | 711/154 |
| 2022/0206877 A1* | 6/2022 | Sohail | G06F 9/4881 |
| 2023/0026794 A1* | 1/2023 | Hwang | G06F 16/2379 |

* cited by examiner

New Method

Figure 3C

Kernel

MICROKERNEL-BASED SOFTWARE OPTIMIZATION OF NEURAL NETWORKS

CROSS-REFERENCE TO RELATED APPLICATIONS

This application claims the benefit of U.S. Provisional Application 62/990,496, filed on Mar. 17, 2020, which is hereby incorporated by reference in its entirety.

FIELD

This invention relates generally to the field of computer science, and more particularly to providing for optimized software implementations of artificial intelligence networks.

BACKGROUND

Artificial intelligence ("AI") networks, such as neural networks, deep learning, machine learning, convolutional neural networks ("CNNs") and others have recently contributed substantially to various technical fields and are widely in use. Fields such as autonomous driving, speech and language processing and others have benefited greatly from advances in AI. Nonetheless almost any corner of industry and economy can greatly benefit from incorporation and use of AI techniques.

Often, AI techniques require handling and processing complex and/or voluminous data structures, such as vectors, matrixes, tensors and multidimensional data structures having hundreds, thousands or millions of internal data elements. Common operations ("ops") of AI can include basic mathematical functions, including addition, multiplication, subtraction, division, or more complex operations, such as matrix multiplication, convolution, and others, which operate on these complex or voluminous data structures. Various hardware platforms are used to execute and implement AI networks. Those include general-purpose central processing units (CPUs), graphical processing units (GPUs), tensor processing units (TPUs) and others.

Such AI networks can consist of computational graphs with nodes representing ops, and connections in between those ops. Each op computes something on input data in order to produce output data. Within AI networks there are fairly predefined ops, and there can be, e.g., hundreds or thousands of these ops. Such ops often use many pieces of input data from within the network. An AI network can be thought of at one level as a list of ops that get executed in a particular order to produce an output.

Operators and developers of AI networks are interested in making them as efficient as possible, on many possible hardware components and across many different hardware architectures. One challenge involved in this goal is that in order to run an AI network on a particular piece of hardware, it's necessary to support every op that particular AI network uses on that particular piece of hardware.

Two traditional approaches for implementing or coding an AI network can be outlined, with both having advantages and disadvantages.

One approach to coding an AI network involves designing and optimizing the software code implementing the AI network for a target hardware. For example, some workloads can be coded to target running the AI network on a central processing unit (CPU). Other AI networks may be coded and optimized for running on graphical processing units (GPUs). Furthermore, each AI network can include a variety of operations, including additions, multiplications, scalar or vector operations, matrix operations, tensor operations and others. Kernels can be used to implement one or more ops on the AI network. For example, a kernel can be a program code implementing matrix multiplication, an inverse function or any other op, ops or combination of ops that may be found in an AI network. With the hardware-specific approach of writing code for AI networks, kernel codes are manually written by human programmers based on the specification of the hardware on which the kernels are going to run on. Consequently, a kernel for a neural network will have to be manually rewritten if the network is to run on a different hardware platform. Hardware-specific kernels can be efficient, as their underlying code is written with their running time hardware in mind. Therefore, ops can be made more efficient and hardware utilization can be high in such implementations.

Another approach to coding an AI network, which allows for more platform flexibility, is to make the kernels hardware-independent (i.e., hardware-agnostic), where the code is adapted or modified depending on hardware platforms which may be used to run the AI network. This approach works similarly to how a high-level programming language can be written generically, with layers of data abstraction, as well as incorporating compilers, run-time processors, or preprocessors to make the appropriate conversions for the code to run on a given hardware platform. The disadvantage with this approach is that it can be significantly inefficient in performance in exchange for making the AI network code generic or hardware-independent.

Thus, there is a need in the field of computer science to create a new and useful system and method for providing optimized software implementations of artificial intelligence networks. The source of the problem, as discovered by the inventors, is a lack of software implementation methods for AI networks that result in efficient AI networks which are deployable across many different hardware components and platforms.

SUMMARY

One embodiment relates to providing for optimized software implementations of artificial intelligence ("AI") networks. The system receives operations ("ops") consisting of a set of instructions to be performed within an AI network. The system then receives microkernels implementing one or more instructions to be performed within the AI network for a specific hardware component. Next, the system generates a kernel for each of the operations. Generating the kernel for each of the operations includes configuring input data to be received from the AI network; detecting a specific hardware component to be used; selecting one or more microkernels to be invoked by the kernel based on the detection of the specific hardware component; and configuring output data to be sent to the AI network as a result of the invocation of the microkernel(s).

In some embodiments, each microkernel receives one or more streams of input data, processes the input data, then outputs one or more streams of output data based on the processing of the input data. In some embodiments, incoming input data from the AI network is rearranged such that microkernels can make use of them and receive them as streaming input data.

In some embodiments, the system additionally generates the kernel for each of the operations by compiling software code representing the kernel. In some embodiments, the compilation is performed by a Just-In-Time (JIT) compiler or similar compiler.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated. As used herein, "AI network" can refer to any artificial intelligence network, including neural networks, convolutional neural networks, deep learning networks, or any other computational AI networks.

The presently described systems and methods relate to an improved solution for addressing the undesirable trade-off between the efficiency gains but time and human effort expenditures resulting from manually writing AI network kernel code per hardware implementation, versus the code portability but significant efficiency losses resulting from generic hardware-agnostic implementations. The improved solution relates to using one or more "microkernels" within the implementation of the kernels. As used herein, a microkernel is a hardware-specific implementation, but not an implementation of the entire op as a kernel would be. Instead, a microkernel is a subset of a kernel which serves as a basic building block for the kernel. The kernel in the improved solution, meanwhile, is implemented in a hardware-independent fashion. Rather than kernels implementing hardware-specific instructions, as in the traditional methods, the kernels invoke microkernels in a hardware-independent way. In some embodiments, each microkernel is written using a specific microkernel Application Programming Interface ("API") which is shared across the implementations of that microkernel across different hardware components. Thus, in some embodiments, a kernel can be written to call a microkernel without knowing, or needing to know, which hardware components are being used by a specific device the kernel is running on. In this fashion, a kernel is a hardware-independent software implementation of a particular op for an AI network, and the kernel is implemented by calling one or more microkernels which are hardware-specific software implementations of a subset of the kernel's instructions.

In some embodiments, for each hardware platform, a small number of microkernels (e.g., two to four microkernels in some implementations) can be manually coded by developer(s). Each microkernel is written with hardware-specific instruction sets (using, e.g., x86 intrinsics, assembly for x86 Intel Skylake, or CUDA for NVTDTA® GPUs). Each microkernel supports multiple input/output data formats (layouts) to further help with end-to-end optimization. In some embodiments, each microkernel uses multiple streams of data. In some embodiments, each microkernel can have one or more streams of input data, and one or more streams of output data. In some embodiments, this "streaming data" involves data streaming in real-time or substantially real time from other kernels or operations within the AI network.

From an outside user's (e.g., a kernel developer's) perspective, microkernels for different hardware platforms look and behave identically when they are used and called by a developer who is writing a kernel. In some embodiments, the API for these microkernels is identical, but what changes is the number of input data streams, and the actual mathematical operations executed (e.g., addition, multiplication, fused multiply-add, or any other suitable operation). Subsequently, higher-level ops (such as, e.g., convolution, matrix multiplication, etc.) are written in a way that can use these microkernels. The op itself, however, is oblivious to the internal, hardware-specific implementation of the microkernel.

An example use case can illustrate how microkernels can work in practice. A large electronics company has developed a major new hardware platform for AI processing. The hardware platform includes a GPU custom-built by the company. They then ask an AI developer to demonstrate performance of their AI workloads running on the custom GPU. Due to the microkernel-based architecture of the AI software stack, the developer is able to port, tune, and optimize their software to the hardware platform within just two weeks. Without the microkernel-based architecture in place, the developer would be forced to manually port a large number of hand-coded operations, which would be a multi-month effort.

In one scenario, the developer is able to port the software to the hardware platform so quickly because the developer's software is written to leverage microkernels which are already present in both their internal development platform as well as on the new platform. Even though the specific hardware implementation of each microkernel varies from platform to platform, the microkernel's API across different platforms is the same. If a developer wants to write software in such a way that they can easily support a new hardware platform for their software down the line, they would manually write ops which use the microkernel's API in a hardware-agnostic fashion. Once the developer writes these ops, they can take advantage of the microkernels in the new hardware platform's GPU, because those microkernels are called into via the API by the ops in the same way as microkernels in other hardware.

In a second scenario, the developer can manually write a small number of microkernels (e.g., 3 or 4) for the hardware platform in question. Once these microkernels are written, the developer can take advantage of ops which have already been written for the software. These previously-written ops call into those 3 or 4 microkernels in a hardware-agnostic way. Thus, by merely writing the microkernels for the platform which are then called into by the previously-written ops, the software can be easily ported to new hardware. As long as a hardware platform supports microkernels, a developer can thus port its software to run on that platform with little effort, either by writing microkernels specific to that platform that can plug into previously-written ops, or by writing ops for previously-written microkernels for that platform.

Figure 1A:
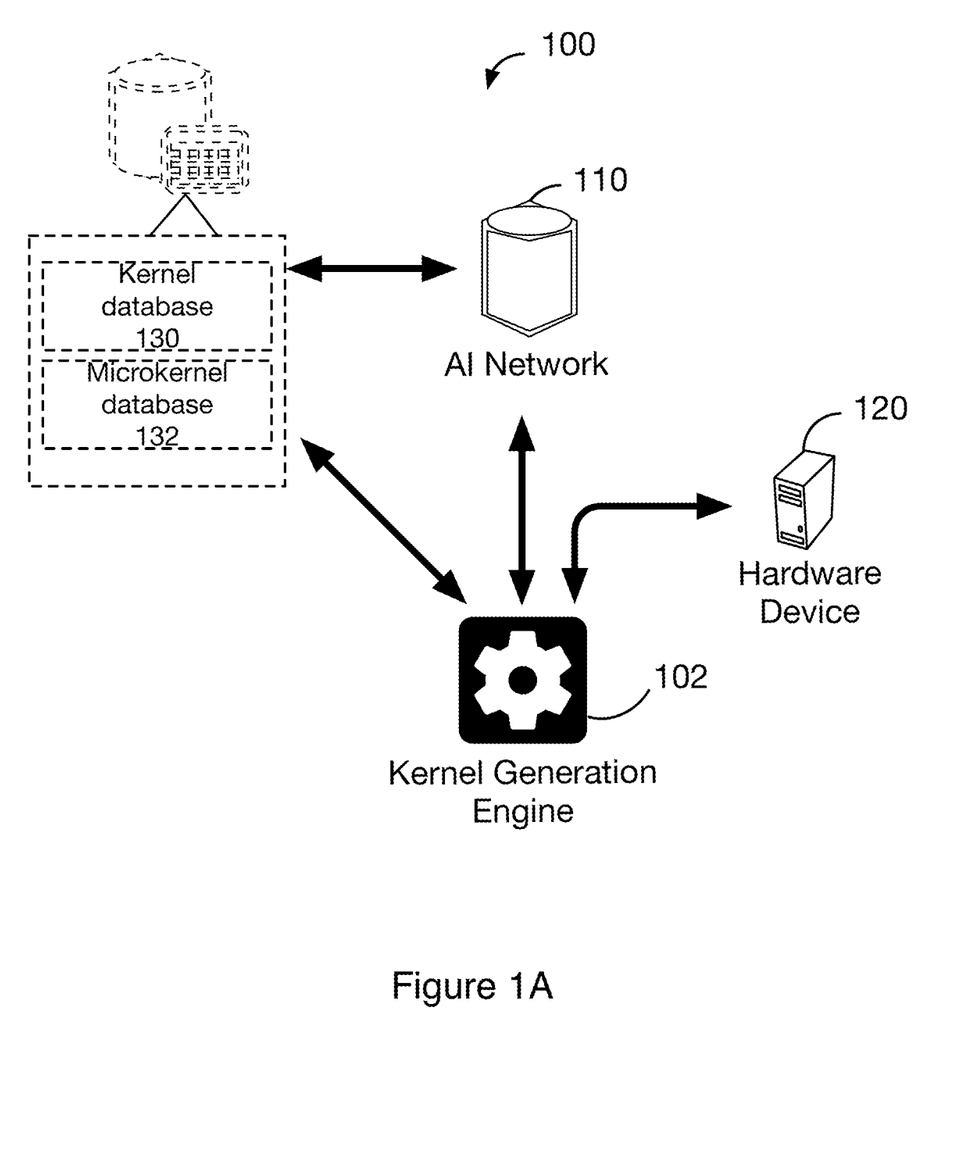
FIG. 1A is a diagram illustrating an exemplary environment in which some embodiments may operate.

FIG. 1 is a diagram illustrating an exemplary environment 100 in which some embodiments may operate. The exemplary environment 100 includes a kernel generation engine 102, AI network 110, hardware device 120, optional kernel database 130, and optional microkernel database 132. One or both of the optional databases may be combined or split into multiple databases.

The exemplary environment 100 is illustrated with only one hardware device, AI network, and kernel generation engine for simplicity, though in practice there may be more or fewer hardware devices, AI networks, and kernel generation engines. In some embodiments, one or more of the AI network, kernel generation engine, and optional database(s) may be a component of, or implemented within, the same computer or device.

The kernel generation engine 102 of the system 100 may perform functionality as illustrated in FIGS. 2A, 2B, 2C, 3B, 3C, and 4 with respect to a target AI network 110. The kernel generation engine 102 functions to generate one or more kernels as implemented in software. The one or more kernels form the implementation of a set of instructions for an operation of the AI network 110, as described above.

The AI network 110 may perform functionality as illustrated in FIGS. 2A, 2B, 2C, 3B, 3C, and 4. In some embodiments, the AI network 110 is a neural network or deep learning network. In various embodiments, the AI network may be a neural network ("NN"), deep learning network, convolutional neural network ("CNN"), machine learning ("ML") network, random forest model, regression model, or any other suitable computational and/or statistical model.

The hardware device 120 of the system 100 may perform functionality as illustrated in FIGS. 2A, 2B, 2C, 3B, 3C, and 4 in order to maintain and/or execute some or all aspects of the target AI network 110. The kernel generation engine 102 generates kernels which can be executed for one or more specific hardware components of the hardware device 120.

While the optional databases 130 and 132 are displayed separately, the databases and the information maintained in the databases may be combined together or further separated in a manner that promotes retrieval and storage efficiency and/or data security. The optional databases may also store and/or maintain any other suitable information for the kernel generation engine 102 to perform elements of the methods and systems herein.

Figure 1B:
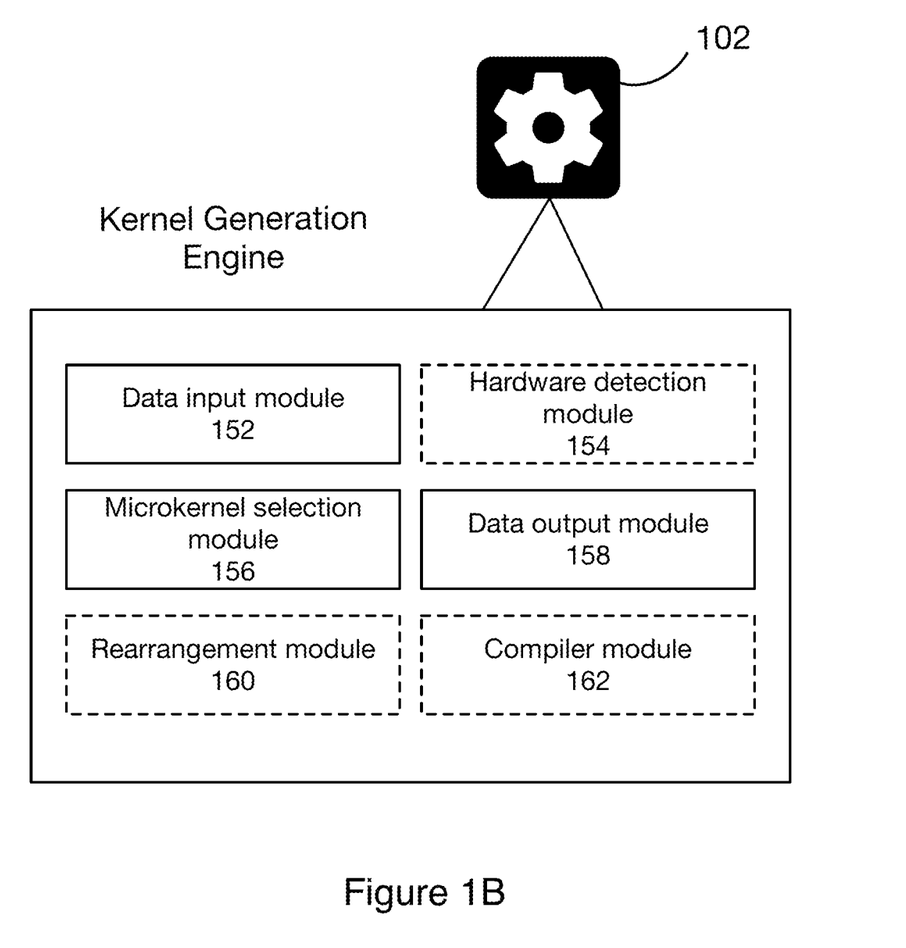
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Data input module 152 functions to receive input data from one or more sources. In some embodiments, the sources may include one or more of: the AI network 120; one or more kernels within the AI network 120; one or more operations within the AI network 120; and one or more microkernels within the AI network 120, the hardware device 120, and/or the kernel being generated by the kernel generation engine 102. In some embodiments, input data may come in a specific data format or multiple data formats which can be readable by one or more of the microkernels and/or kernels within the system 100.

Optional hardware detection module 154 functions to detect one or more specific hardware components or a specific hardware device 120 which will be used to maintain and/or execute the AI network 110.

Microkernel selection module 156 functions to select one or more microkernels which are configured to be called by the kernel being generated.

Data output module 158 functions to configure the output of data from the kernel being generated as a result of the processes performed by the one or more microkernels being invoked within the kernel. Once generated, the kernel will output data accordingly when executed within an AI network.

Optional rearrangement module 160 functions to rearrange data within the kernel being generated such that input data received from one or more sources (via the data input module 152) can be ingested and subsequently processed by one or more of the microkernels being invoked within the kernel.

Optional compiler module 162 functions to compile software code which implements the kernel within the kernel generation engine 102. In some embodiments, this compiler may be a Just-In-Time ("JIT") compiler or other similar compiler.

Figure 2A:
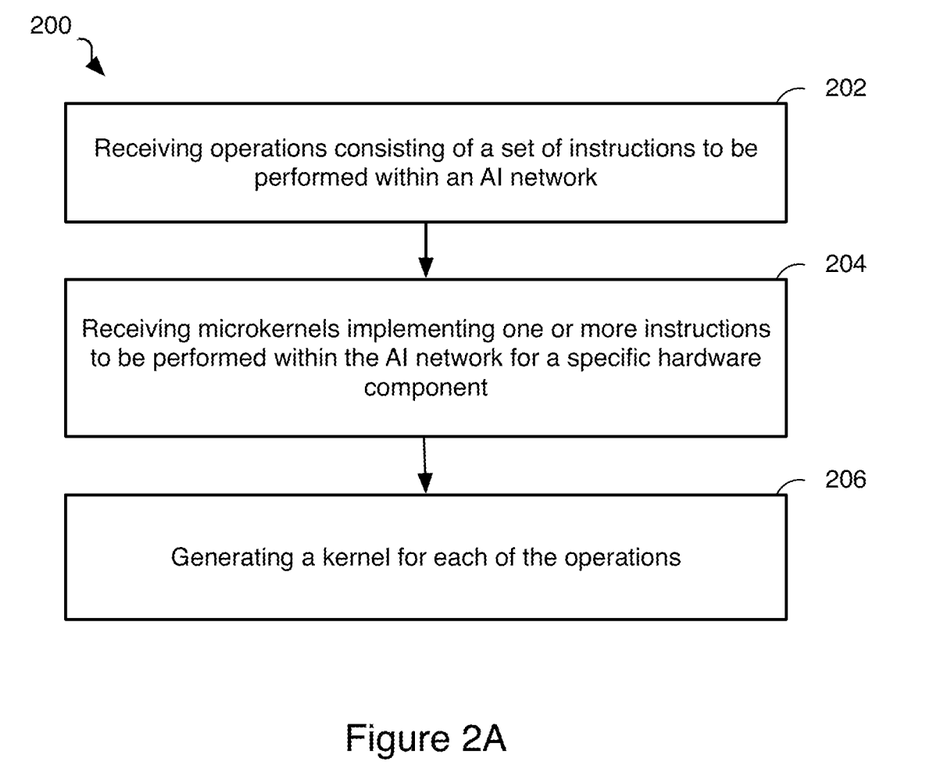
FIG. 2A is a flow chart illustrating an exemplary method that may be performed in some embodiments.

FIG. 2A is a flow chart illustrating an exemplary method 200 that may be performed in some embodiments.

At step 202, the system receives operations (i.e., ops) comprising a set of instructions to be performed within an AI network. In some embodiments, each operation and each instruction is a high-level, conceptual operation or instruction. For example, one operation can involve performing matrix multiplication for matrices A and B, both of which are three-dimensional matrices. The set of instructions involves multiplying the matrices together, e.g., through pointwise multiplication or other form of multiplication. In this example, the op may have to take the inner dimension of matrix A, take the outer dimension of matrix B, and perform an operation on the inner and outer dimensions accordingly.

At step 204, the system receives microkernels implementing one or more instructions to be performed within the AI network for a specific hardware component. In some embodiments, the microkernels are received from a microkernel database 132 storing a number of microkernels for various hardware components. The microkernels represent simple computational operations or basic building blocks that make up a subset of the set of instructions implemented within a kernel. In some embodiments, each microkernel uses multiple streams of data. In some embodiments, each microkernel can have one or more streams of input data, and one or more streams of output data. In some embodiments, this "streaming data" involves data streaming in real-time or substantially real time from other kernels or operations within the AI network. Microkernels process streams of data, including, in some embodiments, large amounts of input data. For example, a microkernel may be able to process, e.g., one thousand inputs of a certain data type, one thousand inputs of another data type, and one thousand inputs of a third data type, then output them in a three-dimensional output of a fourth data type. Many such possibilities of various sizes and configurations may exist for different microkernels. In some embodiments, the microkernels are each configured to receive input data and send output data in a number of different data formats.

Figure 2B:
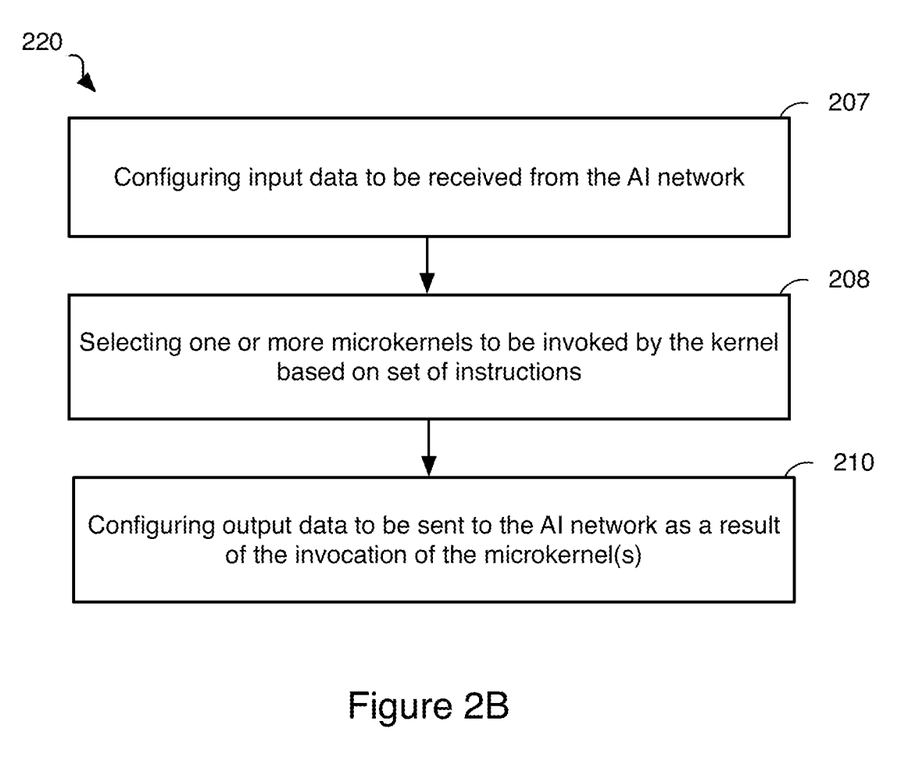
FIG. 2B is a flow chart illustrating an exemplary method that may be performed in some embodiments.

At step 206, the system generates a kernel for each of the operations. In some embodiments, the kernel generated is executable on a number of different hardware components at runtime (due to microkernels as described elsewhere), yet at a software code level is hardware-agnostic. FIG. 2B will further describe the kernel generation process.

FIG. 2B is a flow chart illustrating an exemplary method 220 that may be performed in some embodiments. Specifically, exemplary method 220 shows a series of steps for generating a kernel for each of the operations, as in step 206 of FIG. 2A.

At step 207, the system configures input data to be received from the AI network. In some embodiments, the input data is configured such that one or more outputs from other kernels are fed as inputs into the kernel being generated. In some embodiments, this is performed in a dynamic way depending on the overall weights of nodes within the AI network. Many forms of input data in different data formats can be contemplated to be received from kernels within the AI network depending on a variety of factors.

At optional step 208, the system selects one or more microkernels to be invoked within the kernel. In some embodiments, each selected microkernel performs a subset of the set of instructions for the operation, and the microkernels are selected based on the set of instructions from the operation to be implemented. For example, if the operation specifies that instructions A, B, and C are to be performed, and microkernel B implements instruction B, then the system selects microkernel B to be invoked as part of the set of instructions to be implemented within the kernel being generated. In some embodiments, the system selects the microkernels in a hardware-agnostic or hardware-independent fashion. For example, the system can simply invoke a microkernel using the microkernel's API, without specifying any specific hardware that needs to be implemented. When the microkernel is invoked at runtime, the hardware component calls the specific microkernel which is implemented for that hardware component. Thus, configuring the calling of a microkernel within the kernel is a high-level, hardware-independent process, while the microkernel being called at runtime is specific to the hardware on which the kernel is being executed.

At step 209, the system configures output data to be sent to the AI network as a result of the invocation of the microkernel(s). Since each microkernel being called will take in input data, process the input data, and send out output data, the result of a series of microkernels being called in a sequential order and data being piped from one microkernel to the next in that sequential order results in a final output being sent out at the end of the kernel operation. This final output may be, for example, the output sent out from the last microkernel called in step 208. In some embodiments, the output data is sent to one or more destinations within the AI network 110 based on the weightings of nodes and other factors within the AI network.

Figure 2C:
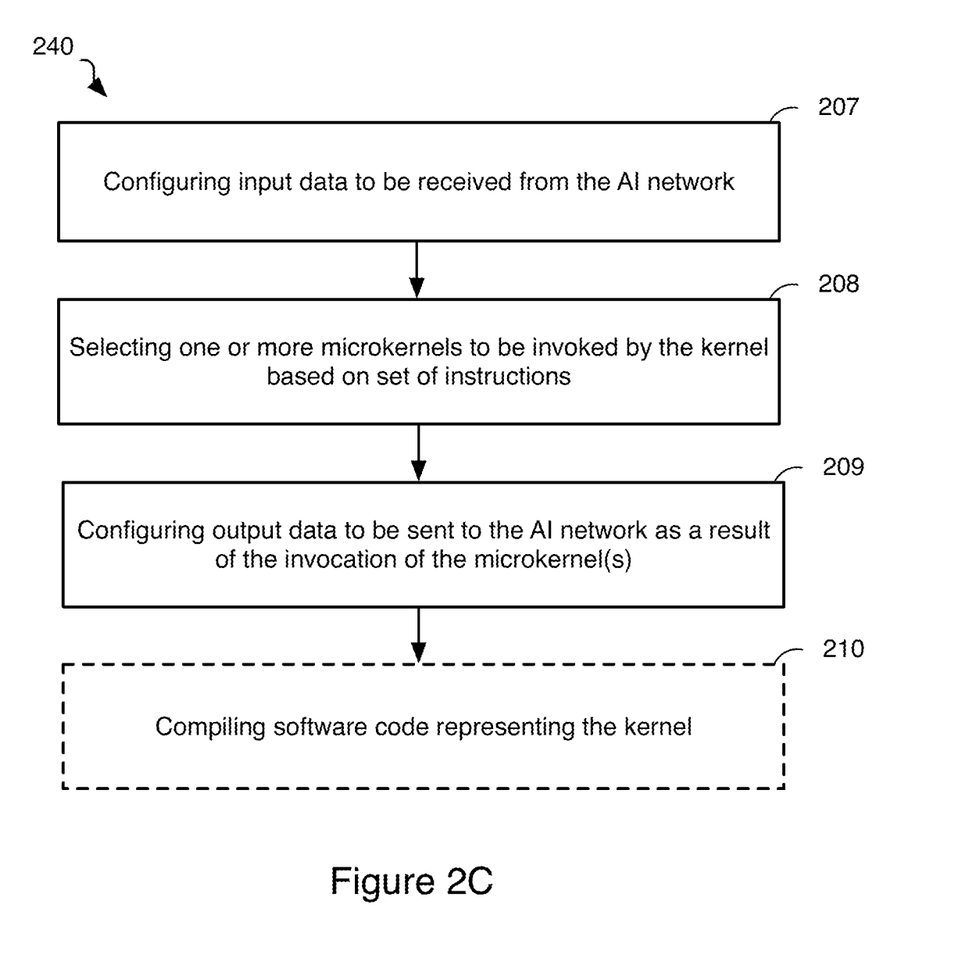
FIG. 2C is a flow chart illustrating additional steps that may be performed in accordance with some embodiments.

FIG. 2C is a flow chart illustrating additional steps that may be performed in accordance with some embodiments. Steps 207-209 are identical to steps 207-209 of FIG. 2B.

At additional optional step 210 during the kernel generation process, the system compiles software code representing the kernel. In some embodiments, the software code is compiled using a Just-In-Time ("JIT") compiler or other similar compiler. In some embodiments, the software code is dynamically compiled, or compiled and/or interpreted at runtime. In some embodiments, one or more optimization steps are applied to the software code as a result of this compilation process according to known JIT methods and processes. In some embodiments, during the runtime compilation, particular microkernels for the hardware component(s) being used during runtime are invoked in the process of the kernel being compiled at runtime.

Figure 3A:
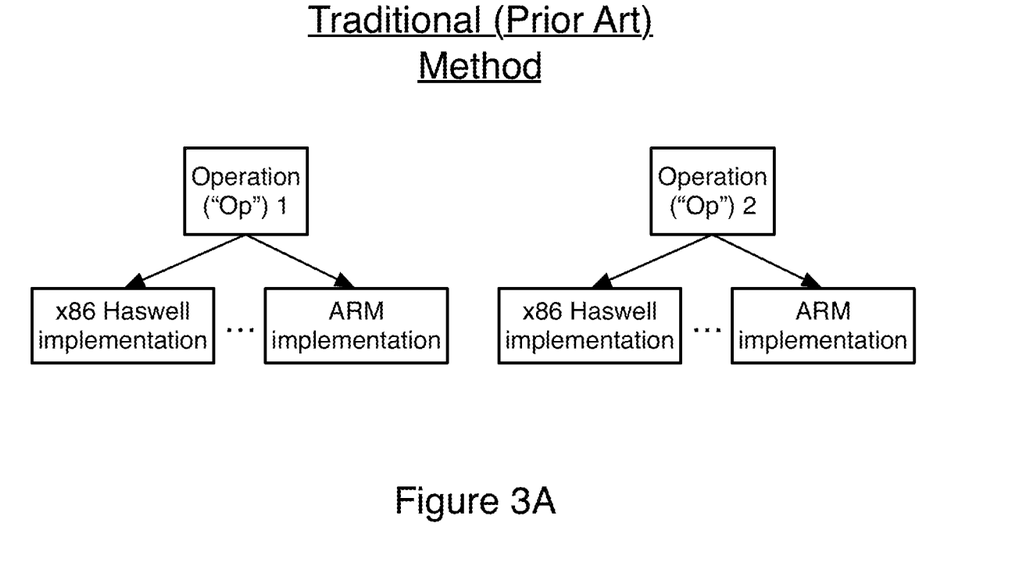
FIG. 3A is a diagram illustrating a traditional method of providing a software implementation of a neural network, according to prior art embodiments.

FIG. 3A is a diagram illustrating a traditional method of providing a software implementation of a neural network, according to prior art embodiments.

Within the traditional method which has typically been performed, Op1 and Op2 within an AI network, which represent computational operations to be performed by the AI network, are each capable of being implemented within kernels for multiple specific hardware components. These kernels for hardware components are represented by the examples of a kernel implementing an x86 Haswell CPU, a kernel implementing an ARM CPU, and an arbitrary number of other hardware components. Each of the ops1 (Op1 and Op2) in the example must separately have manually-written kernel implementations for each of the supported hardware components, which can be tedious and/or challenging for developers, time-consuming, and resource-intensive. While it's possible to achieve high hardware utilization, there are often hundreds or thousands of ops to implement. Each such op must be manually hand-crafted and kept up-to-date for each target hardware platform or chip, which is a daunting task.

Alternatively, a generic graph NN compiler (e.g., TVM) can be used to generate binary code with a standard multi-platform compiler (e.g., LLVM). This allows a developer to write an op once, and have the compiler handle the generation of code for each platform. The downside to this is that very low hardware utilization is achieved, which slows down the execution significantly.

Figure 3B:
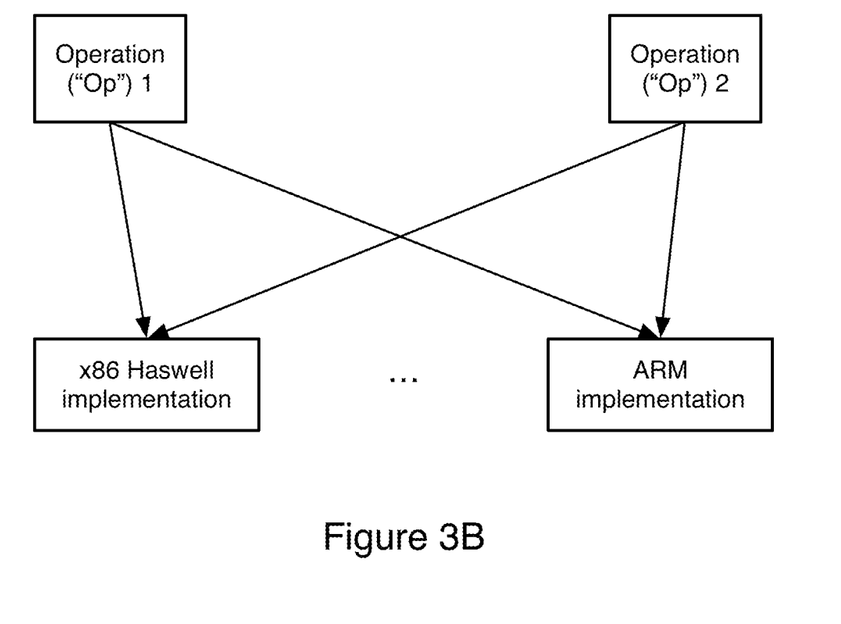
FIG. 3B is a diagram illustrating one example embodiment of a process for providing an optimized software implementation of a neural network in accordance with some of the systems and methods herein.

FIG. 3B is a diagram illustrating one example embodiment of a process for providing an optimized software implementation of a neural network in accordance with some of the systems and methods herein. Specifically, the diagram illustrates an example implementation of operations being performed in a hardware-independent fashion. There are two operations, Op1 and Op2, as well as two hardware components represented by x86 and ARM CPUs, as in the traditional method. However, in the new method, both Op1 and Op2 can be implemented within each of these hardware components by invoking the same microkernels dedicated to that specific hardware implementation.

Figure 3C:
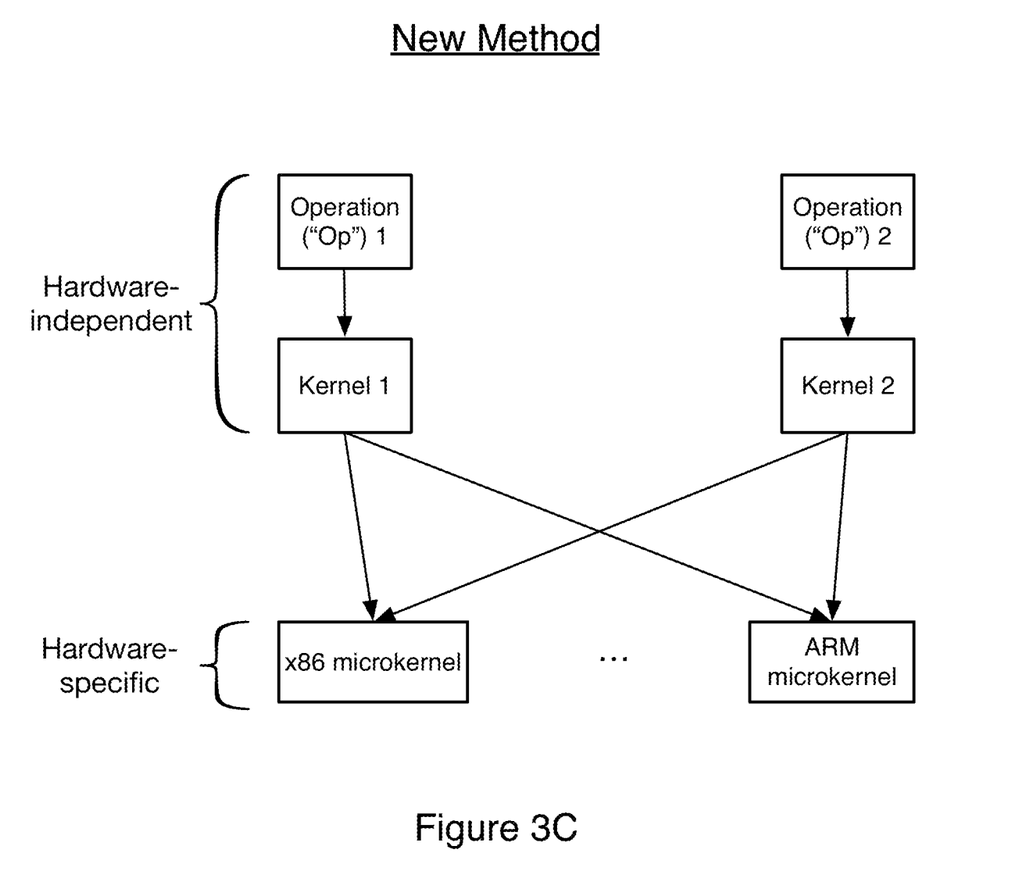
FIG. 3C is a diagram illustrating one example embodiment of a process for providing an optimized software implementation of a neural network in accordance with some of the systems and methods herein.

FIG. 3C is a diagram illustrating one example embodiment of a process for providing an optimized software implementation of a neural network in accordance with some of the systems and methods herein. Specifically, the diagram illustrates an example of the present method utilizing kernels and microkernels. Op1 and Op2 are both hardware-independent, meaning they are unaware of and unconcerned with which specific hardware component must implement the op in question. The ops are each implemented via a Kernel 1 and a Kernel 2, respectively. These kernels are also hardware-independent, and are represented by high-level software code. This software code is also written in such a way that the hardware being used is unknown and not needed for implementation. Finally, each kernel calls one or more microkernels which implement an x86 CPU and an ARM CPU, respectively, in hardware-specific software code. Although an x86 microkernel and ARM microkernel are illustrated in the example, many other hardware implementations and architectures can be contemplated. A given microkernel will share the same API across multiple different hardware implementations, so from the kernel perspective (or the kernel developer's perspective), the microkernel only needs to be called without knowledge or need for the specific hardware component the kernel is being implemented for. The appropriate microkernel for the specific hardware component is called, and the kernel implements the operation.

Figure 4:
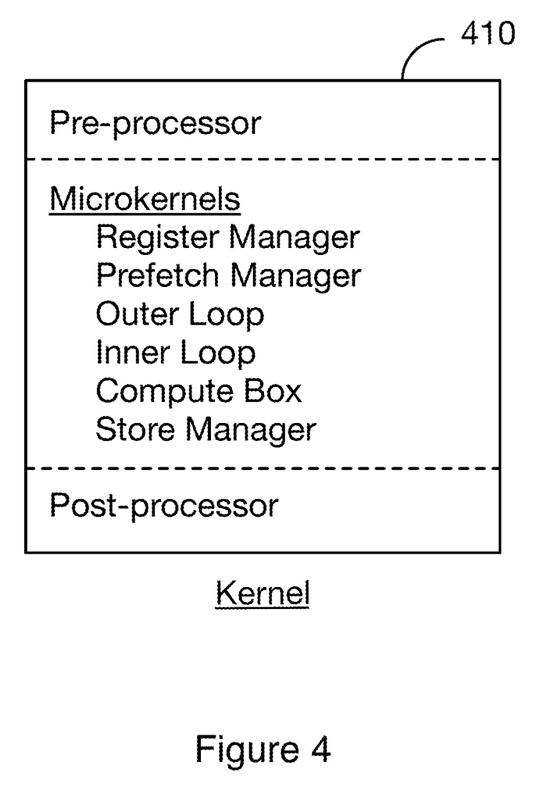
FIG. 4 is a diagram illustrating one example embodiment of a kernel which invokes multiple microkernels in accordance with some of the systems and methods herein.

FIG. 4 is a diagram illustrating one example embodiment of a kernel which invokes multiple microkernels in accordance with some of the systems and methods herein. The kernel 410 includes a pre-processor, a number of microkernels, and a post-processor.

The pre-processor and post-processor function within the kernel to make appropriate conversions for the software code to run on a given hardware platform. Specifically, preprocessors and post-processors are configured to perform input/output data conversion, sometimes in real time or substantially real time during processing tasks. In some embodiments, instead of or in addition to data conversion, the preprocessors or post processors can populate an input/output data structure as the underlying data for the data structure is being generated by a previous kernel/microkernel (in the case of a preprocessor) or by the kernel/microkernel (in the case of a postprocessor). In other words, in some embodiments, pre or postprocessors eliminate the need for data conversion, instead they generate an efficient input/output data structure dynamically and in the first instance, as opposed to generating an intermediary data structure and then subsequently converting the intermediary data structure to a more efficient data structure. In some embodiments, pre-processing and/or post-processing are performed concurrently with compilation via a JIT compiler.

The microkernels specified within the example embodiment include a Register Manager, Prefetch Manager, Outer Loop, Inner Loop, Compute Box, and Store Manager. Each microkernel constitutes a subset of the set of instructions for the operation that the kernel is implementing. Although specific microkernels are mentioned in the example, any combination of these or other microkernels can be contemplated for invocation within a kernel.

Figure 5:
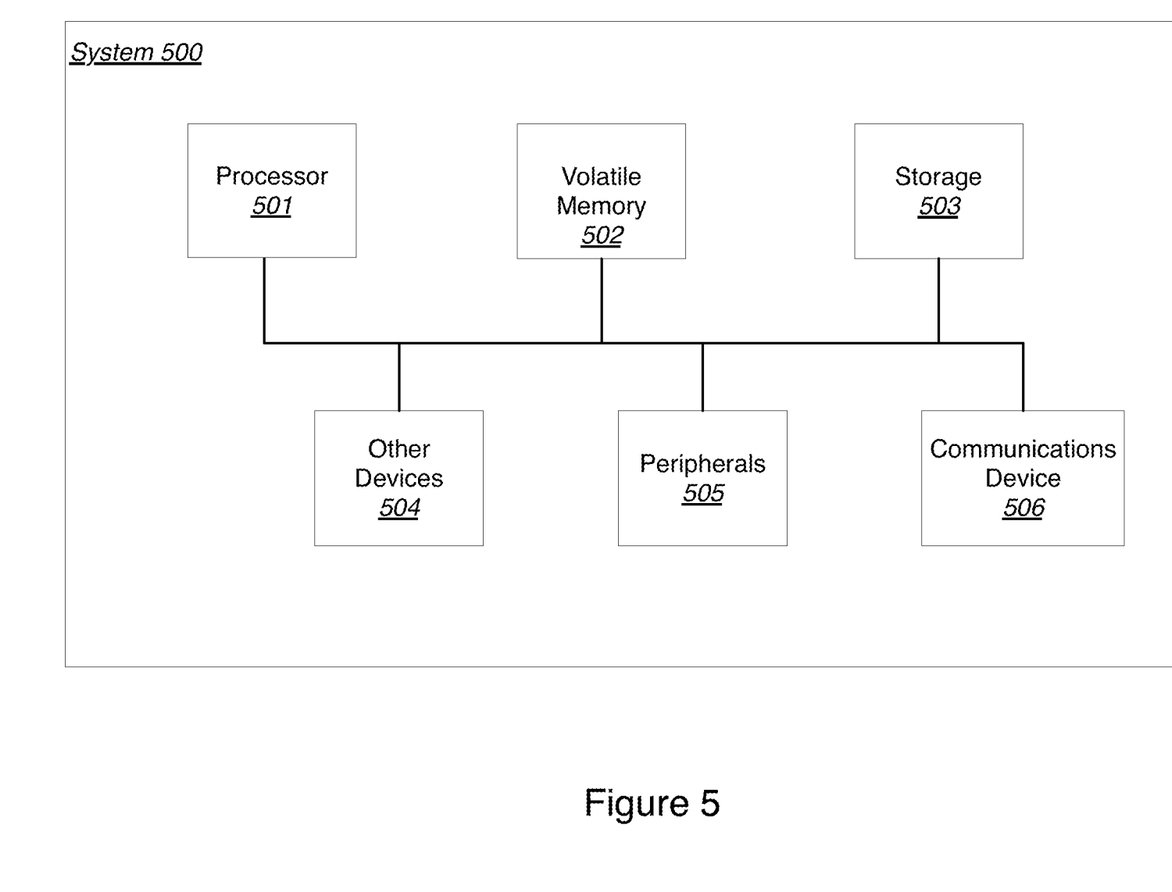
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method for providing a software implementation of an Artificial Intelligence (AI) network, comprising:
   receiving a plurality of operations, each operation comprising a set of instructions to be performed within the AI network;
   receiving a plurality of microkernels, each microkernel implementing one or more instructions to be performed within the AI network for a specific hardware component; and
   generating a kernel for each of the one or more operations, wherein each kernel is a software implementation of the operation within the AI network, and wherein the generating the kernel for each of the one or more operations comprises:
   configuring input data to be received from the AI network;
   selecting one or more microkernels to be invoked by the kernel, wherein each microkernel performs a subset of the set of instructions for the operation, and wherein the microkernels are selected based on the set of instructions; and
   configuring output data to be sent to the AI network as a result of the invocation of the microkernels.

2. The method of claim 1, wherein each of the plurality of microkernels receives and processes one or more input data streams to produce one or more output data streams.

3. The method of claim 1, wherein the kernel is executable on a plurality of different hardware components.

4. The method of claim 1, wherein the one or more microkernels are each configured to receive input data and send output data in a plurality of data formats.

5. The method of claim 1, wherein the generating the kernel for each of the one or more operations further comprises compiling software code representing the kernel.

6. The method of claim 5, wherein the software code is compiled using a Just-In-Time (JIT) compiler.

7. The method of claim 1, wherein each of the one or more microkernels implementing the same one or more instructions for different specific hardware components operate identically according to the same Application Programming Interface (API) functionality.

8. The method of claim 1, wherein the generating the kernel further comprises rearranging the input data to be read into the input data streams of at least a subset of the one or more microkernels in real time or substantially real time.

9. The method of claim 1, wherein the generating the kernel further comprises performing one or more optimization steps on software code representing the kernel.

10. The method of claim 1, wherein the AI network is a deep learning network or neural network.

11. A non-transitory computer-readable medium containing instructions for providing a software implementation of an Artificial Intelligence (AI) network, the instructions for execution by a computer system, the non-transitory computer-readable medium comprising:
    instructions for receiving a plurality of operations, each operation comprising a set of instructions to be performed within the AI network;
    instructions for receiving a plurality of microkernels, each microkernel implementing one or more instructions to be performed within the AI network for a specific hardware component;
    instructions for generating a kernel for each of the one or more operations, wherein each kernel is a software implementation of the operation within the AI network, and wherein the instructions for generating the kernel for each of the one or more operations comprise:
        instructions for configuring input data to be received from the AI network;
        instructions for selecting one or more microkernels to be invoked by the kernel, wherein each microkernel performs a subset of the set of instructions for the operation, and wherein the microkernels are selected based on the set of instructions; and
        instructions for configuring output data to be sent to the AI network as a result of the invocation of the microkernels.

12. The non-transitory computer-readable medium of claim 11, wherein each of the plurality of microkernels receives and processes one or more input data streams to produce one or more output data streams.

13. The non-transitory computer-readable medium of claim 11, wherein the kernel is executable on a plurality of different hardware components.

14. The non-transitory computer-readable medium of claim 11, wherein the one or more microkernels are each configured to receive input data and send output data in a plurality of data formats.

15. The non-transitory computer-readable medium of claim 11, wherein the instructions for generating the kernel for each of the one or more operations further comprise instructions for compiling software code representing the kernel.

16. The non-transitory computer-readable medium of claim 15, wherein the software code is compiled using a Just-In-Time (JIT) compiler.

17. The non-transitory computer-readable medium of claim 11, wherein each of the one or more microkernels implementing the same one or more instructions for different specific hardware components operate identically according to the same Application Programming Interface (API) functionality.

18. The non-transitory computer-readable medium of claim 11, wherein the instructions for generating the kernel further comprise instructions for rearranging the input data to be read into the input data streams of at least a subset of the one or more microkernels in real time or substantially real time.

19. The non-transitory computer-readable medium of claim 1, wherein the instructions for generating the kernel further comprise instructions for performing one or more optimization steps on software code representing the kernel.

20. The non-transitory computer-readable medium of claim 1, wherein the AI network is a deep learning network or neural network.

* * * * *